(12) United States Patent
Fukao et al.

(10) Patent No.: US 7,444,364 B2
(45) Date of Patent: Oct. 28, 2008

(54) FILE OPERATION LIMITING SYSTEM, FILE OPERATION LIMITING PROGRAM, FILE OPERATION LIMITING METHOD, ELECTRONICS AND PRINTING APPARATUS

(75) Inventors: Akihito Fukao, Chino (JP); Shinya Taniguchi, Suwa (JP)

(73) Assignee: Seiko Epson Corporation (JP)

( * ) Notice: Subject to any disclaimer, the term of this patent is extended or adjusted under 35 U.S.C. 154(b) by 517 days.

(21) Appl. No.: 11/297,715

(22) Filed: Dec. 8, 2005

(65) Prior Publication Data

US 2006/0181735 A1    Aug. 17, 2006

(30) Foreign Application Priority Data

Feb. 14, 2005  (JP)  ............... 2005-035648
Aug. 25, 2005  (JP)  ............... 2005-244163

(51) Int. Cl.
*G06F 17/30* (2006.01)
*G06F 13/00* (2006.01)

(52) U.S. Cl. ................ 707/205; 707/200; 358/1.16

(58) Field of Classification Search ............... 358/1.16, 358/1.17; 707/200, 205, 10, 104.1; 348/207.1
See application file for complete search history.

(56) References Cited

U.S. PATENT DOCUMENTS

| | | | |
|---|---|---|---|
| 5,915,085 A | 6/1999 | Koved | |
| 6,105,137 A | 8/2000 | Graunke et al. | |
| 6,148,401 A | 11/2000 | Devanbu et al. | |
| 6,308,317 B1 | 10/2001 | Wilkinson et al. | |
| 6,374,266 B1 * | 4/2002 | Shnelvar | 707/204 |
| 6,405,327 B1 | 6/2002 | Sipple et al. | |
| 6,772,106 B1 | 8/2004 | Mahlke et al. | |
| 2002/0120660 A1 | 8/2002 | Hay et al. | |

(Continued)

FOREIGN PATENT DOCUMENTS

EP    1126655    2/2000

(Continued)

OTHER PUBLICATIONS

"HBench:Java: An application-specific benchmarking framework for Java Virtual Machines", Concurrency and Computation Practice & Experience Wiley UK, vol. 13, No. 8-9, Jul. 2001, pp. 775-792, XP002468828 ISSN: 1532-0626.

(Continued)

*Primary Examiner*—Hung T Vy
(74) *Attorney, Agent, or Firm*—Harness, Dickey & Pierce, P.L.C.

(57) ABSTRACT

A file operation limiting system limiting a file operation for a file stored in a storage unit. The storage unit including a file storage area. The file operation limiting system including: a file storage area limiting unit limiting the file operation per file storage area; a total file number obtaining unit obtaining a total file number of a file storage area not limited; a file number limiting unit limiting the file operation when the total file number exceeds a predetermined upper-limit value; a total file capacity obtaining unit obtaining total file capacity of a file storage area not limited by the file storage area limiting unit; and a file capacity limiting unit for limiting the file operation when the total file capacity after the file operation exceeds a predetermined upper-limit value.

14 Claims, 4 Drawing Sheets

U.S. PATENT DOCUMENTS

| | | | |
|---|---|---|---|
| 2003/0009484 A1* | 1/2003 | Hamanaka et al. | 707/200 |
| 2004/0167859 A1 | 8/2004 | Mirabella | |
| 2004/0199764 A1 | 10/2004 | Koechling et al. | |
| 2004/0252198 A1* | 12/2004 | Hatanaka | 348/207.1 |
| 2004/0267868 A1 | 12/2004 | Wilk | |
| 2005/0050107 A1* | 3/2005 | Mane et al. | 707/200 |
| 2006/0041587 A1* | 2/2006 | Grubbs et al. | 707/104.1 |

FOREIGN PATENT DOCUMENTS

| | | |
|---|---|---|
| EP | 1349077 | 10/2003 |
| EP | 1 475 710 A1 | 11/2004 |
| GB | 2249414 | 5/1992 |
| JP | 04-364971 | 12/1992 |
| JP | 2000-215089 | 8/2000 |
| JP | 2000-330833 | 11/2000 |
| JP | 2003-108409 | 4/2003 |
| TW | 435035 | 5/2001 |
| TW | 200502818 | 1/2005 |
| WO | WO 01/35223 | 5/2001 |
| WO | WO 01/40900 | 6/2001 |

OTHER PUBLICATIONS

Shiping Chen, Yan Liu, Ian Gorton, Anna Liu: "Performance prediction of component-based applications" The Journal of Systems and Software, No. 74, Jan. 21, 2004, pp. 35-43, XP002468829.

Xiaolan Zhang: "Application-specific Benchmarking" [Online] May 2001, XP002468832, Chapter 2-4.

Czajkowski G. et al: "JRes: a resource accounting interface for Java" SIGPLAN Notices ACM USA, vol. 33, No. 10, Oct. 1998, pp. 21-35, XP002469308 ISSN: 0362-1340.

Rayside D et al: "Extracting Java library subsets for deployment on embedded systems" Proceedings of the Third European Conference on Software Maintenance and Reengineering (Cat. No. PR00090) IEEE Comput. Soc Los Alamitos, CA, USA, 1999, pp. 102-110, XP002469309 ISBN: 0-7695-0090-0.

Posegga J et al: "Byte code verification for Java smart cards based on model checking" Proceedings of the European Symposium on Research in Computer Security (ESORICS), Springer Verlag, Berlin, DE, Oct. 18, 1998, pp. 175-190, XP002447200.

Aspinall D. et al: "Mobile resource guarantees for smart devices" Construction and Analysis of Safe, Secure, and Interoperable Smart Devices. International Workshop, Cassis 2004. Revised Selected Papers (Lecture Notes in Computer Science vol. 3362) Springer-Verlag Berlin, Germany, Jan. 28, 2005, pp. 1-26, XP002469525.

* cited by examiner

FILE OPERATION LIMITING SYSTEM, FILE OPERATION LIMITING PROGRAM, FILE OPERATION LIMITING METHOD, ELECTRONICS AND PRINTING APPARATUS

RELATED APPLICATIONS

This application claims priority to Japanese Patent Application Nos. 2005-035648 filed Feb. 14, 2005 and 2005-244163 filed Aug. 25, 2005 which are hereby expressly incorporated by reference herein in their entirety.

BACKGROUND OF THE INVENTION

1. Technical Field

The present invention relates to a system and a program for limiting a file operation for a file and a method of the same, particularly, a file operation limiting system, a file operation limiting program, a file operation limiting method, electronics and a printing apparatus, which are suitable for stably operating an apparatus using a storage device and for certainly controlling the capacity of a file.

2. Related Art

A file monitoring system disclosed in JP-A-2000-330833, for example, has been known as a technique for monitoring a condition of a file in a personal computer or an office apparatus.

In an invention disclosed in JP-A-2000-330833, a storage place of a file subject to monitoring and upper-limit capacity values of the latest file capacity and the file capacity are stored in a storage device, the file capacity of the file subject to monitoring is read out and the latest file capacity is compared with the upper-limit capacity value to output report information including a name and capacity of a file exceeding the upper-limit capacity value, time of exceeding the upper-limit capacity value and the upper-limit capacity value in the case that the file capacity exceeds the upper-limit capacity value.

JP-A-2000-330833 is an example of related art.

JP-A-4-364971 is another example of related art.

In some printers for confidential printing such as the invention disclosed in JP-A-4-364971, printing data sent from a terminal of a host is stored in a storage device and a user inputs identification information to the printer to carry out print based on the printing data of the storage device when the inputted identification information is accorded with the identification information of the printing data. In such a printer for confidential printing, printing data of plural users should be stored in the printer. In this case, when a specific user A prints extremely large printing data or executes plural printing jobs at a time, the printing data of the user A almost exhausts the storage capacity of the printer, so that printing data of the other users cannot be stored in the printer. This causes a problem in that other users cannot carry out printing until the user A completes printing.

In the invention disclosed in JP-A-2000-330833, file capacity is limited for every file. This allows file capacity used by an individual file to be controlled. When the invention disclosed in JP-A-2000-330833 is applied to file control in a confidential printing printer, however, an increase in the number of printing data in the storage device causes very large total file capacity of all printing data even in the case that file capacity of respective printing data is under the upper-limit value thereof. This also causes the above problem.

Such a problem is not limited to the case of confidential printing but similarly expected in all environments where a file is controlled within limited storage capacity. That is to say, when executing a requirement with a file operation (a requirement by a user or an application, for example) pressures the storage capacity, execution of another requirement with a file operation is obstructed. This causes a problem in that an apparatus using the storage device cannot be operated stably.

Further, in the invention disclosed in JP-A-2000-330833, monitoring whether the file capacity exceeds the upper-limit value or not is carried out in a predetermined cycle. Accordingly, the file capacity is likely to temporally exceed the upper-limit value when timing of a file operation is not accorded with timing of the monitoring. This causes a problem in that the file capacity cannot be certainly controlled.

SUMMARY

An advantage of some aspects of the invention is to provide a file operation limiting system, a file operation limiting program, a file operation limiting method, electronics and a printing apparatus, which are suitable for stably operating an apparatus using a storage device and for certainly controlling the capacity of a file.

Aspect 1: A file operation limiting system according to a first aspect of the invention is a file operation limiting system for limiting a file operation for a file stored in a storage unit, wherein the storage unit includes a file storage area into which a storage area of the storage unit is logically sectioned, the file operation limiting system comprising:

a file storage area limiting unit for limiting the file operation for every file storage area for at least a part of the sectioned file storage areas;

a total file number obtaining unit for obtaining a total file number of a file storage area not limited by the file storage area limiting unit whenever the file operation is carried out for the file storage area among the sectioned file storage areas;

a file number limiting unit for limiting the file operation when the total file number after the file operation is judged to exceed a predetermined upper-limit value of a file number based on the total file number obtained by the total file number obtaining unit;

a total file capacity obtaining unit for obtaining total file capacity of a file storage area not limited by the file storage area limiting unit whenever the file operation is carried out for the file storage area among the sectioned file storage areas; and a file capacity limiting unit for limiting the file operation when the total file capacity after the file operation is judged to exceed a predetermined upper-limit value of file capacity based on the total file capacity obtained by the total file capacity obtaining unit.

In such a structure, the file storage area limiting unit limits a file operation for every file storage area for at least a part of the sectioned file storage areas.

Further, whenever the file operation is carried out for a file storage area, which is not limited, among the sectioned file storage areas, the total file number obtaining unit obtains a total file number of the file storage area. The file number limiting unit limits the file operation when the total file number after the file operation is judged to exceed a predetermined upper-limit value of a file number based on the obtained total file number.

Moreover, whenever the file operation is carried out for a file storage area not limited among the sectioned file storage areas, the total file capacity obtaining unit obtains total file capacity of the file storage area. The file capacity limiting unit limits the file operation when the total file capacity after the file operation is judged to exceed a predetermined upper-limit value of file capacity based on the obtained total file capacity.

This allows the file operation to be limited for every file storage area in accordance with the total file number and the total file capacity of the file storage area, so that a risk of pressure on the storage capacity due to execution of one requirement with a file operation can be reduced. Accordingly, execution of another requirement with a file operation is hardly obstructed, and thereby, an apparatus using the storage unit can be more stably operated than the case up to the present.

In addition to the above, obtaining the total file number and the total file capacity of the file storage area in every file operation to judge whether the limitation is carried out or not allows the total file number and the total file capacity to be prevented from even temporally exceeding the upper-limit values. Accordingly, the total file number and the total file capacity can be controlled more certainly than the case up to the present.

In this context, the file operation includes a file operation by a user, an application and other materials capable of operating a file. Concretely, forming a new file, deleting a file, writing into a file, reading from a file and changing the size of a file are included, for example. This is true of a file operation limiting system in Aspect 6, a file operation limiting program in Aspect 7, file operation limiting methods in Aspects 12 and 13, electronics in Aspect 18 and a printing apparatus in Aspect 19.

The limitation of a file operation includes suspension of a currently executed file operation and prohibition of a file operation, for example. This is true of the file operation limiting system in Aspect 6, the file operation limiting program in Aspect 7, the file operation limiting methods in Aspects 12 and 13, the electronics in Aspect 18 and the printing apparatus in Aspect 19.

The file number limiting unit may be arranged in any structure so long as the file operation is limited so that the total file number does not exceed the upper-limit value. The file number limiting unit may be arranged to limit all of the file operation or a part of the file operation. In the latter case, a structure can be considered that, among file operations, an operation having the total file number exceeding the upper-limit value is limited while an operation having the total file number not exceeding the upper-limit value is allowed, for example. This is true of the file operation limiting system in Aspect 6, the electronics in Aspect 18 and the printing apparatus in Aspect 19.

The file capacity limiting unit may be arranged in any structure so long as the file operation is limited so that the total file capacity does not exceed the upper-limit value. The file number limiting unit may be arranged to limit all of the file operation or a part of the file operation. In the latter case, a structure can be considered that, among file operations, an operation having the total file capacity exceeding the upper-limit value is limited while an operation having the total file capacity not exceeding the upper-limit value is allowed, for example. This is true of the file operation limiting system in Aspect 6, the electronics in Aspect 18 and the printing apparatus in Aspect 19.

The system may be put into practice as a single apparatus, terminal or another equipment or as a network system in which plural apparatuses, terminals or other equipment are connected so as to be capable of communication. In the latter case, the respective components may belong to any one of the plural equipments so long as they are connected so as to be able to communicate, respectively.

Aspect 2: A file operation limiting system in accordance with a second aspect of the invention is a file operation limiting system according to the file operation limiting system in Aspect 1, wherein
the total file number obtaining unit does not obtain the total file number while the file number limiting unit does not limit the file operation when the file operation is judged to be a file operation for a file stored in the file storage area.

In such a structure, the total file number obtaining unit does not obtain the total file number while the file number limiting unit does not limit the file operation when the file operation is judged to be a file operation for a file stored in the file storage area, namely, a file operation for an existing file. The file operation for an existing file does not increase the file number, and therefore, limitation relating to the file number is not necessary.

This allows the total file number not to be obtained and the file operation not to be limited in the file operation for an existing file. Accordingly, an effect of reducing a process load without any influence on control of the file number can be achieved.

Aspect 3: Further, a file operation limiting system in accordance with a third aspect of the invention is a file operation limiting system according to the file operation limiting system in Aspect 1, wherein
the total file capacity obtaining unit does not obtain the total file capacity while the file capacity limiting unit does not limit the file operation when the file operation is judged to be a file operation for a file stored in the file storage area and not to exceed the file capacity of the file.

In such a structure, the total file capacity obtaining unit does not obtain the total file capacity while the file capacity limiting unit does not limit the file operation when the file operation is judged to be a file operation not exceeding the file capacity of a file stored in the file storage area, namely, the file capacity of an existing file. The file operation not exceeding the file capacity of an existing file does not increase the file capacity, and therefore, limitation relating to the file capacity is not necessary.

This allows the total file capacity not to be obtained and the file operation not to be limited in the file operation not exceeding the file capacity of an existing file. Accordingly, an effect of reducing a process load without any influence on control of the file capacity can be achieved.

Aspect 4: Moreover, a file operation limiting system in accordance with a fourth aspect of the invention is a file operation limiting system according to the file operation limiting system in Aspect 3, wherein
a predetermined buffer area is added to an area for storing file information of a new file to store the new file in the storage unit when the new file is stored in the file storage area.

In such a structure, a predetermined buffer area is added to an area for storing file information to store a new file in the storage unit. Accordingly, even when in a file operation for an existing file, the file operation increases the capacity of file information, the total file capacity obtaining unit does not obtain the total file capacity and the file capacity limiting unit does not limit the file operation so long as the increased capacity does not exceed the capacity of the buffer area secured in the storage area of the file.

This allows occasions of limiting the file capacity to be decreased, and thereby, an effect of further reducing the process load to be achieved.

In the above context, the new file includes a file under a file name not existing in the storage unit at that time, for example.

This is true of a file operation limiting program in Aspect 10, a file operation limiting method in Aspect 16 and a printing apparatus in Aspect 22.

Aspect 5: Further, a file operation limiting system in accordance with a fifth aspect of the invention is a file operation limiting system according to the file operation limiting system in Aspect 1, wherein the file operation is a file operation by an application and an upper-limit value of the file number and an upper-limit value of the file capacity are set for every application.

This allows the upper-limit values of the file number and the file capacity to be set for every application to limit the file operation, so that a risk of pressure on the storage capacity due to execution of one application with a file operation can be reduced. Accordingly, execution of another application with a file operation is hardly obstructed.

In the above context, the application includes software designed for a specific purpose such as making of a document and numerical calculation, for example. This is true of a file operation limiting program in Aspect 11, a file operation limiting method in Aspect 17 and a printing apparatus in Aspect 23.

Aspect 6: Moreover, a file operation limiting system in accordance with a sixth aspect of the invention is a file operation limiting system comprising: a storage device; a file operation device for performing a file operation for a file stored in the storage unit; and a file operation limiting device for limiting the file operation, wherein the storage device includes the storage unit,
the storage unit includes a file storage area into which a storage area of the storage unit is logically sectioned,
the file operation device includes a file operation unit for performing the file operation,
the file operation limiting device including:
a file storage area limiting unit for limiting the file operation by the file operation unit for every file storage area for at least a part of the sectioned file storage areas;
a total file number obtaining unit for obtaining a total file number of a file storage area not limited by the file storage area limiting unit whenever the file operation by the file operation unit is carried out for the file storage area among the sectioned file storage areas;
a file number limiting unit for limiting the file operation by the file operation unit when the total file number after the file operation by the file operation unit is judged to exceed a predetermined upper-limit value of a file number based on the total file number obtained by the total file number obtaining unit;
a total file capacity obtaining unit for obtaining total file capacity of the file storage area not limited by the file storage area limiting unit whenever the file operation by the file operation unit is carried out for the file storage area among the sectioned file storage areas; and
a file capacity limiting unit for limiting the file operation by the file operation unit when the total file capacity after the file operation by the file operation unit is judged to exceed a predetermined upper-limit value of file capacity based on the total file capacity obtained by the total file capacity obtaining unit.

In such a structure, the file storage area limiting unit limits the file operation for every file storage area for at least a part of the sectioned file storage areas in the file operation limiting device.

Further, the total file number of a file storage area not limited is obtained by the total file number obtaining unit whenever the file operation by the file operation unit is carried out for the file storage area among the sectioned file storage areas. The file number limiting unit limits the file operation when the total file number after the file operation is judged to exceed a predetermined upper-limit value of a file number based on the obtained total file number.

Moreover, the total file capacity obtaining unit obtains total file capacity of the file storage area not limited whenever the file operation by the file operation unit is carried out for the file storage area among the sectioned file storage areas. The file capacity limiting unit limits the file operation when the total file capacity after the file operation is judged to exceed a predetermined upper-limit value of file capacity based on the obtained total file capacity.

This allows the file operation to be limited for every file storage area based on the total file number and the total file capacity of the file storage area, so that a risk of pressure on the storage capacity due to execution of one requirement with a file operation can be reduced. Accordingly, execution of another requirement with a file operation is hardly obstructed, and thereby, an effect that an apparatus using the storage unit can be more stably operated than the case up to the present.

In addition to the above, obtaining the total file number and the total file capacity of the file storage area in every file operation to judge whether the limitation is carried out or not allows the total file number and the total file capacity to be prevented from even temporally exceeding the upper-limit values. Accordingly, the total file number and the total file capacity can be controlled more certainly than the case up to the present.

Aspect 7: On the other hand, a file operation limiting program in accordance with a seventh aspect of the invention is a file operation limiting program for limiting a file operation for a file stored in a storage unit, wherein the storage unit includes a file storage area into which a storage area of the storage unit is logically sectioned,
the file operation limiting program including a program for executing by a computer a process of:
limiting the file operation for every file storage area for at least a part of the sectioned file storage areas;
obtaining a total file number of a file storage area not limited by limiting the file operation for every file storage area for at least a part of the sectioned file storage areas whenever the file operation is carried out for the file storage area among the sectioned file storage areas;
limiting the file operation when the total file number after the file operation is judged to exceed a predetermined upper-limit value of a file number based on the total file number obtained by obtaining the total file number of the file storage area;
obtaining total file capacity of the file storage area not limited by limiting the file operation for every file storage area for at least a part of the sectioned file storage areas whenever the file operation is carried out for the file storage area among the sectioned file storage areas; and
limiting the file operation when the total file capacity after the file operation is judged to exceed a predetermined upper-limit value of file capacity based on the total file capacity obtained by obtaining the total file capacity of the file storage area.

In such a structure, reading a program by a computer to execute a process by the computer in accordance with the read program allows an operation and an effect equivalent to those of the file operation limiting system in Aspect 1 to be achieved.

In the above context, the file number may be limited in any way so long as the file operation is limited so that the total file number does not exceed the upper-limit value. The limitation may be carried out for all or a part of file operations. In the latter case, a way can be considered that, among the file operations, an operation having the total file number exceeding the upper-limit value is limited while an operation having the total file number not exceeding the upper-limit value is allowed, for example. This is true of the file operation limiting methods in Aspects 12 and 13.

Further, the file capacity may be limited in any way so long as the file operation is limited so that the total file capacity does not exceed the upper-limit value. The limitation may be carried out for all or a part of file operations. In the latter case, a way can be considered that, among the file operations, an operation having the total file capacity exceeding the upper-limit value is limited while an operation having the total file capacity not exceeding the upper-limit value is allowed, for example. This is true of the file operation limiting methods in Aspects 12 and 13.

Aspect 8: A file operation limiting program in accordance with a eighth aspect of the invention is a file operation limiting program according to the file operation limiting program in Aspect 7, wherein the total file number is not obtained in obtaining the total file number of a file storage area while the file operation is not limited in limiting the file operation when the file operation is judged to be a file operation for a file stored in the file storage area.

In such a structure, reading a program by a computer to execute a process by the computer in accordance with the read program allows an operation and an effect equivalent to those of the file operation limiting system in Aspect 2 to be achieved.

Aspect 9: Moreover, a file operation limiting program in accordance with a ninth aspect of the invention is a file operation limiting program according to the file operation limiting program in Aspect 7, wherein the total file capacity is not obtained in obtaining the total file capacity of the file storage area while the file operation is not limited in limiting the file operation when the file operation is judged to be a file operation for a file stored in the file storage area and not to exceed the file capacity of the file.

In such a structure, reading a program by a computer to execute a process by the computer in accordance with the read program allows an operation and an effect equivalent to those of the file operation limiting system in Aspect 3 to be achieved.

Aspect 10: In addition, a file operation limiting program in accordance with a tenth aspect of the invention is a file operation limiting program according to the file operation limiting program in Aspect 9, wherein a predetermined buffer area is added to an area for storing file information of a new file to store the new file in the storage unit when the new file is stored in the file storage area.

In such a structure, reading a program by a computer to execute a process by the computer in accordance with the read program allows an operation and an effect equivalent to those of the file operation limiting system in Aspect 4 to be achieved.

Aspect 11: Furthermore, a file operation limiting program in accordance with an eleventh aspect of the invention is a file operation limiting program according to the file operation limiting program in Aspect 7, wherein the file operation is a file operation by an application and an upper-limit value of the file number and an upper-limit value of the file capacity are set for every application.

In such a structure, reading a program by a computer to execute a process by the computer in accordance with the read program allows an operation and an effect equivalent to those of the file operation limiting system in Aspect 5 to be achieved.

Aspect 12: A file operation limiting method in accordance with a twelfth aspect of the invention is a file operation limiting method for limiting a file operation for a file stored in a storage unit, wherein the storage unit includes a file storage area into which a storage area of the storage unit is logically sectioned, the file operation for every file storage area for at least a part of the sectioned file storage areas is limited, a total file number of a file storage area not limited by limiting the file operation for every file storage area for at least a part of the sectioned file storage areas is obtained whenever the file operation is carried out for the file storage area among the sectioned file storage areas, the file operation is limited when the total file number after the file operation is judged to exceed a predetermined upper-limit value of a file number based on the total file number obtained by obtaining the total file number of the file storage area, total file capacity of the file storage area not limited by limiting the file operation for every file storage area for at least a part of the sectioned file storage areas is obtained whenever the file operation is carried out for the file storage area among the sectioned file storage areas, and the file operation is limited when the total file capacity after the file operation is judged to exceed a predetermined upper-limit value of file capacity based on the total file capacity obtained by obtaining the total file capacity of the file storage area.

This contributes to achievement of an effect equivalent to that of the file operation limiting system in Aspect 1.

Aspect 13: A file operation limiting method in accordance with a thirteenth aspect of the invention is a file operation limiting method for limiting a file operation for a file stored in a storage unit, wherein the storage unit includes a file storage area into which a storage area of the storage unit is logically sectioned, a calculating unit limits the file operation for every file storage area for at least a part of the sectioned file storage areas, a calculating unit obtains a total file number of a file storage area not limited by limiting the file operation for every file storage area for at least a part of the sectioned file storage areas whenever the file operation is carried out for the file storage area among the sectioned file storage areas, a calculating unit limits the file operation when the total file number after the file operation is judged to exceed a predetermined upper-limit value of a file number based on the total file number obtained by obtaining the total file number of the file storage area, a calculating unit obtains total file capacity of the file storage area not limited by limiting the file operation for every file storage area for at least a part of the sectioned file storage areas whenever the file operation is carried out for the file storage area among the sectioned file storage areas, and a calculating unit limits the file operation when the total file capacity after the file operation is judged to exceed a predetermined upper-limit value of file capacity based on the total file capacity obtained by obtaining the total file capacity of the file storage area.

This contributes to achievement of an effect equivalent to that of the file operation limiting system in Aspect 1.

Aspect 14: Further, a file operation limiting method in accordance with a fourteenth aspect of the invention is a file operation limiting method according to the file operation limiting method in Aspect 12, wherein
the total file number is not obtained in obtaining the total file number of a file storage area while the file operation is not limited in limiting the file operation when the file operation is judged to be a file operation for a file stored in the file storage area.

This contributes to achievement of an effect equivalent to that of the file operation limiting system in Aspect 2.

Aspect 15: Moreover, a file operation limiting method in accordance with a fifteenth aspect of the invention is a file operation limiting method according to the file operation limiting method in Aspect 12, wherein
the total file capacity is not obtained in obtaining the total file capacity ob the file storage area while the file operation is not limited in limiting the file operation when the file operation is judged to be a file operation for a file stored in the file storage area and not to exceed the file capacity of the file.

This contributes to achievement of an effect equivalent to that of the file operation limiting system in Aspect 3.

Aspect 16: In addition, a file operation limiting method in accordance with a sixteenth aspect of the invention is a file operation limiting method according to the file operation limiting method in Aspect 15, wherein
a predetermined buffer area is added to an area for storing file information of a new file to store the new file in the storage unit when the new file is stored in the file storage area.

This contributes to achievement of an effect equivalent to that of the file operation limiting system in Aspect 4.

Aspect 17: In addition, a file operation limiting method in accordance with a seventeenth aspect of the invention is a file operation limiting method according to the file operation limiting method in Aspect 12, wherein
the file operation is a file operation by an application and an upper-limit value of the file number and an upper-limit value of the file capacity are set for every application.

This contributes to achievement of an effect equivalent to that of the file operation limiting system in Aspect 5.

Aspect 18: Electronics in accordance with an eighteenth aspect of the invention is electronics for limiting a file operation for a file stored in a storage unit, wherein
the storage unit includes a file storage area into which a storage area of the storage unit is logically sectioned,
the electronics comprising:
a file storage area limiting unit for limiting the file operation for every file storage area for at least a part of the sectioned file storage areas;
a total file number obtaining unit for obtaining a total file number of a file storage area not limited by the file storage area limiting unit whenever the file operation is carried out for the file storage area among the sectioned file storage areas;
a file number limiting unit for limiting the file operation when the total file number after the file operation is judged to exceed a predetermined upper-limit value of a file number based on the total file number obtained by the total file number obtaining unit;
a total file capacity obtaining unit for obtaining total file capacity of the file storage area not limited by the file storage area limiting unit whenever the file operation is carried out for the file storage area among the sectioned file storage areas; and
a file capacity limiting unit for limiting the file operation when the total file capacity after the file operation is judged to exceed a predetermined upper-limit value of file capacity based on the total file capacity obtained by the total file capacity obtaining unit.

In such a structure, an operation and an effect equivalent to those of the file operation limiting system in Aspect 1 can be achieved.

Aspect 19: A printing apparatus in accordance with a nineteenth aspect of the invention is a printing apparatus for limiting a file operation for a file stored in a storage unit, wherein
the storage unit includes a file storage area into which a storage area of the storage unit is logically sectioned,
the printing apparatus comprising:
a file storage area limiting unit for limiting the file operation for every file storage area for at least a part of the sectioned file storage areas;
a total file number obtaining unit for obtaining a total file number of a file storage area not limited by the file storage area limiting unit whenever the file operation is carried out for the file storage area among the sectioned file storage areas;
a file number limiting unit for limiting the file operation when the total file number after the file operation is judged to exceed a predetermined upper-limit value of a file number based on the total file number obtained by the total file number obtaining unit;
a total file capacity obtaining unit for obtaining total file capacity of the file storage area not limited by the file storage area limiting unit whenever the file operation is carried out for the file storage area among the sectioned file storage areas;
a file capacity limiting unit for limiting the file operation when the total file capacity after the file operation is judged to exceed a predetermined upper-limit value of file capacity based on the total file capacity obtained by the total file capacity obtaining unit; and
a printing unit for carrying out printing based on the file in the storage unit.

In such a structure, an operation and an effect equivalent to those of the file operation limiting system in Aspect 1 can be achieved.

Aspect 20: Further, a printing apparatus in accordance with a twentieth aspect of the invention is a printing apparatus according to the printing apparatus in Aspect 19, wherein
the total file number obtaining unit does not obtain the total file number while the file number limiting unit does not limit the file operation when the file operation is judged to be a file operation for a file stored in the file storage area.

In such a structure, an operation and an effect equivalent to those of the file operation limiting system in Aspect 2 can be achieved.

Aspect 21: Moreover, a printing apparatus in accordance with a twenty-first aspect of the invention is a printing apparatus according to the printing apparatus in Aspect 19, wherein
the total file capacity obtaining unit does not obtain the total file capacity while the file capacity limiting unit does not limit the file operation when the file operation is judged to be a file operation for a file stored in the file storage area and not to exceed the file capacity of the file.

In such a structure, an operation and an effect equivalent to those of the file operation limiting system in Aspect 3 can be achieved.

Aspect 22: In addition, a printing apparatus in accordance with a twenty-second aspect of the invention is a printing apparatus according to the printing apparatus in Aspect 21, wherein a predetermined buffer area is added to an area for storing file information of a new file to store the new file in the storage unit when the new file is stored in the file storage area.

In such a structure, an operation and an effect equivalent to those of the file operation limiting system in Aspect 4 can be achieved.

Aspect 23: Furthermore, a printing apparatus in accordance with a twenty-third aspect of the invention is a printing apparatus according to the printing apparatus in Aspect 19, wherein the file operation is a file operation by an application and an upper-limit value of the file number and an upper-limit value of the file capacity are set for every application.

In such a structure, an operation and an effect equivalent to those of the file operation limiting system in Aspect 5 can be achieved.

BRIEF DESCRIPTION OF THE DRAWINGS

The invention will be described with reference to the accompanying drawings, wherein like numbers reference like elements, and wherein.

DESCRIPTION OF THE EMBODIMENTS

Figure 1:
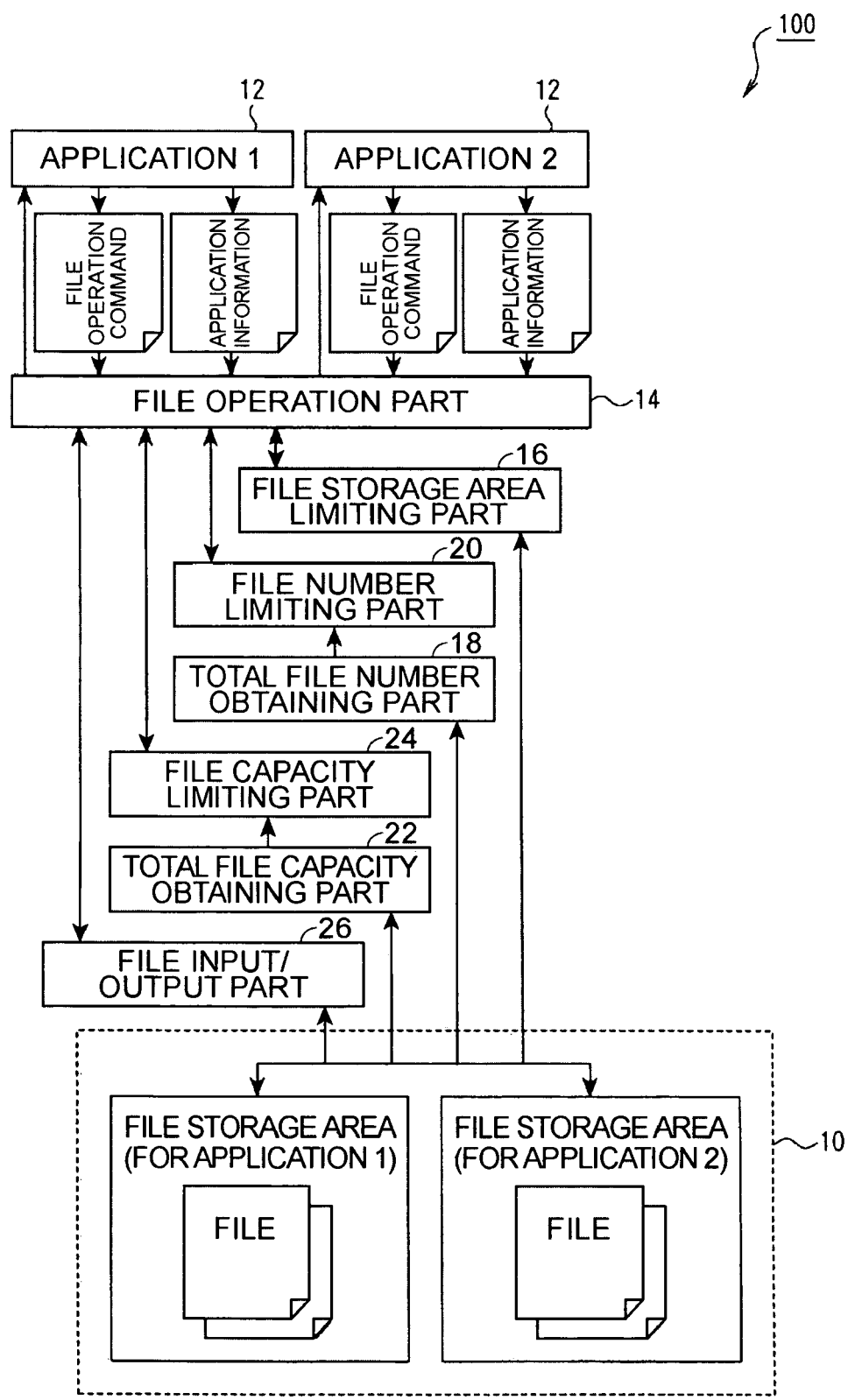
FIG. 1 is a function block diagram showing an outline of a function of a network printer 100.
Figure 2:
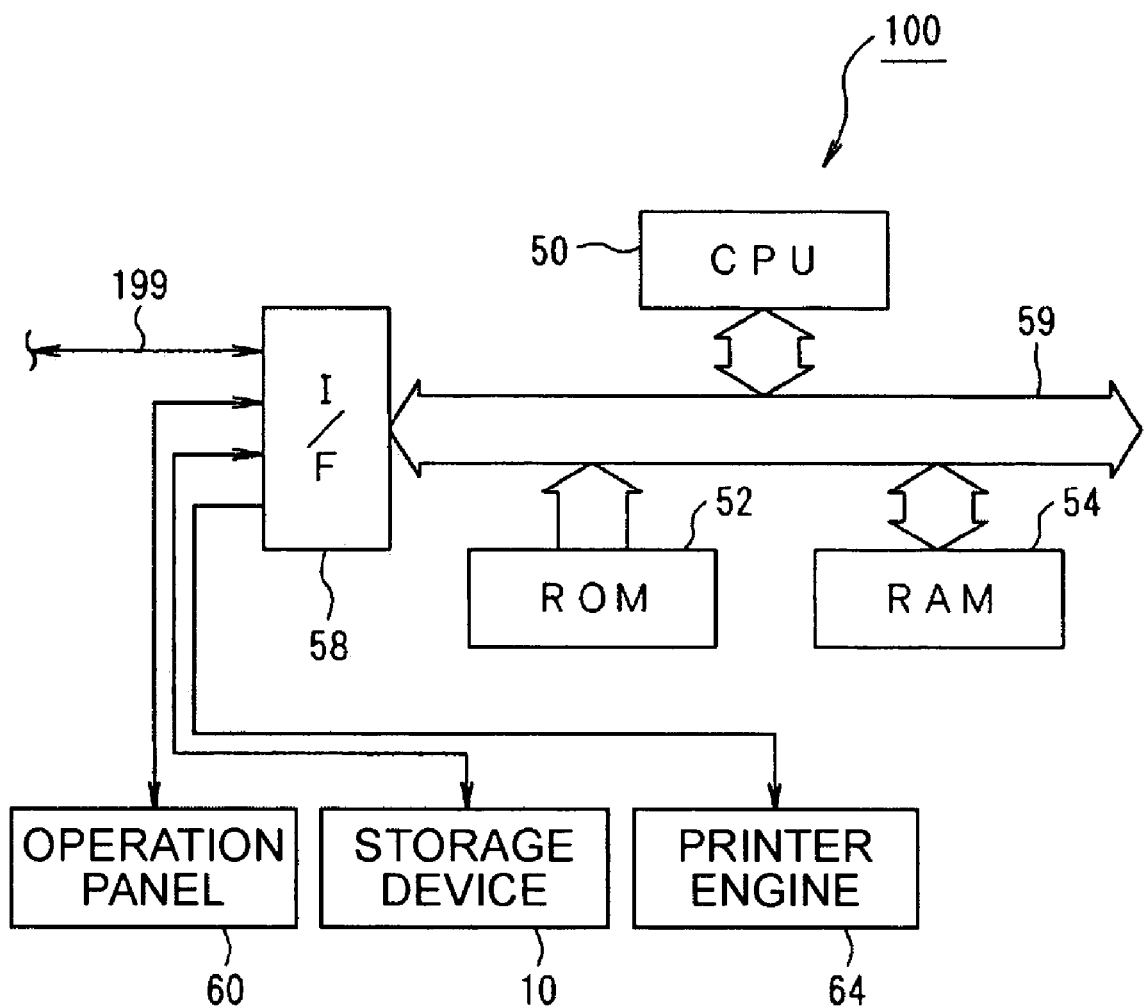
FIG. 2 is a block diagram showing a structure of hardware of the network printer 100.
Figure 3:
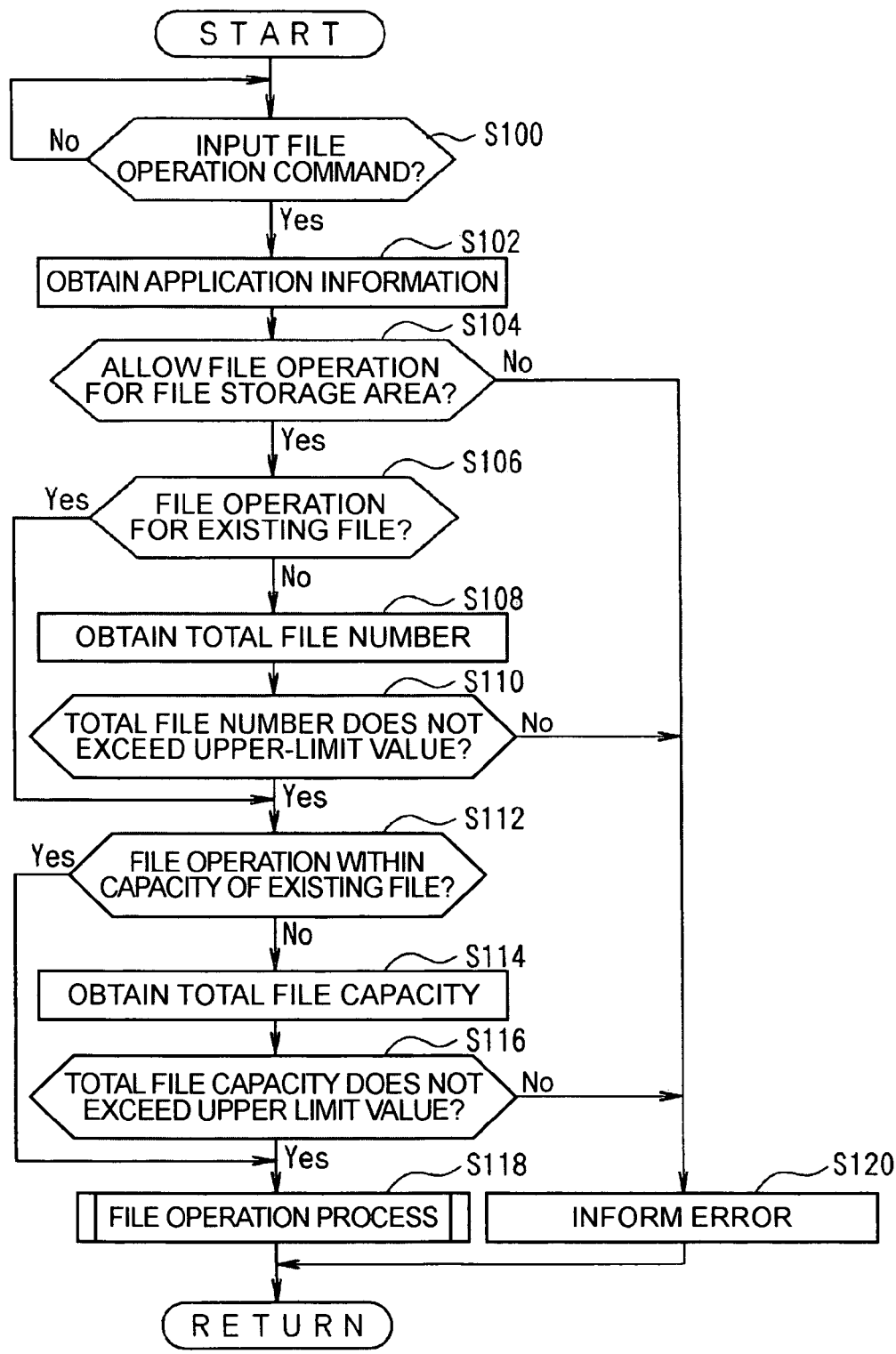
FIG. 3 is a flowchart showing a file operation monitoring process.

Embodiments of the invention will be described hereinafter, with reference to drawings. FIGS. 1 to 3 illustrate embodiments of a file operation limiting system, a file operation limiting program, a file operation limiting method, electronics and a printing apparatus in accordance with the invention.

In the embodiments, the file operation limiting system, the file operation limiting program, the file operation limiting method, the electronics and the printing apparatus in accordance with the invention are applied to a case of controlling printing data sent from a terminal of a host as a file in a network printer 100 for carrying out confidential printing, as shown in FIG. 1.

First, an outline of the network printer 100 to which the invention is applied will be described.

FIG. 1 is a function block diagram showing an outline of a function of the network printer 100.

The network printer 100 comprises a storage device 10 and a file operation part 14 for performing a file operation by application 12 (simply refer to as a file operation, hereinafter) for a file storage area (a directory, for example) of the storage device 10 based on a file operation command given by the application 12 and application information.

The application 12 corresponds to a printer driver installed in each of plural terminals of a host not shown. The application 12 outputs a file operation command, application information and printing data to the file operation part 14 through a network.

The file operation command is a command for carrying out a file operation for a file in the file storage area. The file operation command includes identification information of a file storage area and a file, which are to be file-operated, and contents of the file operation.

The application information is information relating to limitation of a file operation. The application information includes an identification information list of a file storage area for which a file operation is allowed, an upper-limit value of the number of a file capable of storage in the file storage area and an upper-limit value of the file capacity capable of storage in the file storage area.

The network printer 100 further comprises a file storage area limiting part 16 for allowing and limiting a file operation for a file storage area based on the application information, a total file number obtaining part 18 for obtaining a total file number in a file storage area allowed by the file storage area limiting part 16 (refer to as an allowed file storage area, hereinafter) in timing of performing a file operation for the allowed file storage area and a file number limiting part 20 for limiting a file operation when it is judged that the total file number after the file operation exceeds the upper-limit value of the file number included in the application information based on the total file number obtained by the total file number obtaining part 18 and a file operation command.

The network printer 100 further comprises a total file capacity obtaining part 22 for obtaining the total file capacity of the allowed file storage area in timing of performing a file operation for the allowed file storage area, a file capacity limiting part 24 for limiting a file operation when it is judged that the total file capacity after the file operation exceeds the upper-limit value of the file capacity included in the application information based on the total file capacity obtained by the total file capacity obtaining part 22 and a file operation command and a file input/output part 26 for inputting or outputting a file to or from the allowed file storage area based on a file operation command and necessary printing data.

The file operating part 14 outputs a file operation command and necessary printing data to the file input/output part 26 when there is no limitation by any of the file storage area limiting part 16, the file number limiting part 20 and the file capacity limiting part 24.

Now, a structure of the network printer 100 will be described.

FIG. 2 is a block diagram showing a structure of hardware of the network printer 100.

The network printer 100 comprises, as shown in FIG. 2, a CPU 50 for carrying out an operation and controlling a whole system based on a controlling program, a ROM 52 for storing in advance the controlling program of the CPU 50 in a predetermined area, a RAM 54 for storing data read out from the ROM 52 and an operation result necessary in an operation process in the CPU 50 and an I/F 58 for mediating an input and an output of data to and from an external apparatus. The above components are connected with each other by a bus 59, which is a signal line for transmitting data, so as to be capable of transferring data.

The I/F 58 is connected to an operation panel 60 comprising a touch panel or the like capable of inputting and displaying data as a human interface, a storage device 10 for storing data and/or a table as a file, a printer engine 64 comprising a printing head, a head driving part and other mechanisms necessary to printing and a signal line for connection to the network 199, as external apparatuses.

The CPU 50 comprises a micro-processing unit and the like. The CPU 50 starts a predetermined program stored in a predetermined area of the ROM 52 to execute a file operation monitoring process shown in a flowchart in FIG. 3 in accordance with the program.

FIG. 3 is a flowchart showing the file operation monitoring process.

The file operation monitoring process is a process for monitoring a file operation for a file stored in the storage device 10. The file operation monitoring process goes to Step S100 when the CPU 50 executes the process, as shown in FIG. 3.

In Step S100, judged is whether a file operation command is inputted or not. The process goes to Step S102 when it is judged that a file operation command is inputted (Yes). On the other hand, the process stands by in Step S100 until a file operation command is inputted when it is judged that no file operation command is inputted (No).

In Step 102, application information corresponding to the inputted file operation command is obtained. The process then goes to Step S104 in which whether a file operation corresponding to a file storage area included in the file operation command is allowed or not is judged based on identification information of the file storage area and an identification information list of a file storage area included in the application information. When the file operation is judged to be allowed (Yes), the process goes to Step S106.

In step S106, judged is whether or not the required file operation is a file operation for an existing file stored in the allowed file storage area. The process goes to Step S108 when it is judged that the required file operation is not the file operation for the existing file (No).

In Step S108, a total number of files made by the application 12 having outputted the file operation command among files stored in the allowed file storage area is obtained based on FAT (file allocation tables) or the like. The process then goes to Step S110 in which whether the total file number after the file operation does not exceed the upper-limit value of the file number included in the obtained application information or not is judged based on the obtained total file number and the file operation command. When it is judged that the total file number does not exceed the upper-limit value (Yes), the program goes to Step S112.

In Step S112, judged are whether the required file operation is a file operation for the existing file stored in the allowed file storage area or not and whether the required file operation does not exceed the file capacity of the file or not. The program goes to Step S114 when it is judged that the required file operation is not a file operation for the existing file or is a file operation exceeding the file capacity of the existing file (No).

In Step S114, a total capacity of files made by the application 12 having outputted the file operation command among files stored in the allowed file storage area is obtained based on FAT (file allocation tables) or the like. The process then goes to Step S116 to judge whether the total file capacity after the file operation does not exceed the upper-limit value of the file capacity included in the obtained application information or not based on the obtained total file capacity and the file operation command. When it is judged that the total file capacity does not exceed the upper-limit value (Yes), the program goes to Step S118.

In Step S118, a file is inputted or outputted to the allowed file storage area based on the inputted file operation command and printing data in the case that the printing data is necessary for the file operation (in the case of newly making or renewing a file, for example). In the case that the printing data is not necessary for the file operation (in the case of reading a file, for example), a file is inputted or outputted to the allowed file storage area only based on the inputted file operation command. Further, a file number and file capacity in the FAT and such are renewed. Moreover, when a new file is stored in the allowed file storage area, a predetermined buffer area is added to an area for storing file information of the file so as to carry out storage.

When a process in Step S118 is completed, a series of process is completed to return to an original process.

On the other hand, when the total file capacity is judged to exceed the upper-limit value (No) in Step S116, when the total file number is judged to exceed the upper-limit value (No) in Step S110 and when the file operation for the file storage area is judged not to be allowed (No) in Step S104, the process goes to Step S120 to inform a terminal of a host of an error, and then, a series of process is completed to return to an original process.

When the required file operation is judged to be a file operation not exceeding file capacity of the existing file (Yes) in Step S112, the process goes to Step S118.

On the other hand, when the required file operation is judged to be a file operation for the existing file (Yes) in Step S106, the process goes to Step S112.

Now, an operation of the embodiment will be described.

First, exemplified is a case that a storing state of the storage device 10 and a file operation command and application information, which are given by the application 12, have the following contents.

The storage device 10 stores in a file storage area "app 1" three files of "file A", "file B" and "file C", which respectively have file capacity of "100 KB", "300 KB" and "500 KB". Accordingly, the total file number in the file storage area "app 1" is "3" while the total file capacity is 900 KB (100 KB+300 KB+500 KB).

The file operation command includes "/app 1" as a file storage area name (identification information), "file A" as a file name (identification information) and "writing in a file", "writing capacity: 50 KB" and "writing place: 10 KB from the top of the file" as contents of the file operation, respectively. This means that data of 50 KB is written in a file of "file A" in a file storage area "/app 1" with a place of starting writing being 10 KB from the top of the file.

The application information includes "/app 1" as a file storage area name list (an identification information list), "3" as an upper-limit value of the file number and "1000 KB" as an upper-limit value of the file capacity, respectively. This means that a file operation for the file storage area "/app 1" is allowed and that the file storage area "/app 1" can store files of three in number or 1000 KB in capacity.

In a terminal of a host, the application 12 makes a file operation command and the formed file operation command and the application information are outputted to the network printer 100.

In the network printer 100, inputting the file operation command and the application information allows whether a file operation for the file storage area "/app 1" is allowed or not to be judged based on the inputted file operation command and application information in Steps S102 and S104. In the judgment, the file operation is judged to be allowed since the file storage area name "/app 1" in the file operation command exists in the file storage area name list "/app 1" of the application information.

Then, in Step S106, judged is whether the required file operation is a file operation for an existing file or not. In the above case, the required file operation is judged to be a file operation for the existing file since a file of the name of "file A", which is same as the file name in the file operation command, exists in the allowed file storage area "/app 1". Accordingly, the file operation does not cause increase in number of files, so that no process relating to limitation of the number of files (Steps S108 and S110) is carried out.

In Step S112, it is judged whether the required file operation is a file operation not exceeding the file capacity of the existing file or not. In the above case, a file of the name of "file A" same as that of the file operation command exits in the allowed file storage area "/app 1" and the file capacity of the file "file A" is not changed and kept to be "100 KB" even when data of 50 KB is written with a starting point of writing being 10 KB from the top of the file "file A". Accordingly, the required file operation is judged to be a file operation not exceeding the file capacity of the existing file, so that the file operation does not increase the file capacity. Therefore, the process relating to limitation of file capacity (Steps S114 and S116) is not carried out.

Following to the above, data is written in the file "file A" in the allowed file storage area "/app 1" in Step S118.

Now, exemplified will be a case that the file operation command and application information given by the application 12 have the following contents. The state of the storage device 10 and the application information are same as the above.

The file operation command includes "/app 1" as a file storage area name, "file D" as a file name and "forming a new file" as a content of the file operation, respectively. This means that the file "file D" is newly formed in the file storage area "/app 1".

In the network printer 100, inputting the file operation command and the application information allows whether a file operation for the file storage area "/app 1" is allowed or not to be judged based on the inputted file operation command and application information through Steps S102 and S104. In the judgment, the file operation is judged to be allowed since the file storage area name "/app 1" in the file operation command exists in the file storage area name list "/app 1" of the application information.

Then, in Step S106, judged is whether the required file operation is a file operation for an existing file or not. In the above case, the required file operation is judged not to be a file operation for the existing file since a file of the name of "file D", which is same as the file name in the file operation command, does not exist in the allowed file storage area "/app 1". Accordingly, the file operation causes increase in number of files. Therefore, the total file number in the allowed file storage area "/app 1" is obtained to judge whether the total file number after the file operation exceeds the upper-limit value or not based on the obtained total file number in Steps S108 and S110. In the above case, the total file number after the file operation is "1" since the total file number of the allowed file storage area "/app 1" is "3". The total file number after the file operation is judged to be larger than the upper-limit value since the upper-limit value of the file number is "3".

When the total file number exceeds the upper-limit value, the file operation is stopped and the application 12 is informed of an error in Step S120.

When both of the total file number and the total file capacity are judged not to exceed the upper-limit value, the file "file D" is newly formed in the allowed file storage area "/app 1" in Step S118. At that time, a buffer area of predetermined capacity (200 KB, for example) is secured in a storage area of the file "file D". Such a buffer area allows a process relating to limitation of the file capacity to be omitted even when a file operation for the file "file D" is later required as long as the file operation does not exceed the capacity of the buffer area.

Now, exemplified will be a case that the file operation command and application information given by the application 12 have the following contents. The state of the storage device 10 and the application information are same as the above.

The file operation command includes "/app 1" as a file storage area name, "file C" as a file name and "writing in a file", "writing capacity: 500 KB" and "writing place: 200 KB from the top of the file" as contents of the file operation, respectively. This means that data of 500 KB is written in a file "file C" in a file storage area "/app 1" with a place of starting writing being 200 KB from the top of the file.

In the network printer 100, inputting the file operation command and the application information allows whether a file operation for the file storage area "/app 1" is allowed or not to be judged based on the inputted file operation command and application information in Steps S102 and S104. In the judgment, the file operation is judged to be allowed since the file storage area name "/app 1" in the file operation command exists in the file storage area name list "/app 1" of the application information.

Then, in Step S106, judged is whether the required file operation is a file operation for an existing file or not. In the above case, the required file operation is judged to be a file operation for the existing file since a file of the name of "file C", which is same as the file name in the file operation command, exists in the allowed file storage area "/app 1". Accordingly, the file operation does not cause increase in number of files, so that no process relating to limitation of the number of files is carried out.

In Step S112, it is judged whether the required file operation is a file operation not exceeding the file capacity of the existing file or not. In the above case, a file of the name of "file C" same as that of the file operation command exits in the allowed file storage area "/app 1". The file capacity of the file "file C" after writing data of 500 KB from a starting point of 200 KB from the top of the file "file C", however, is 200 KB+500 KB="700 KB" while the total file capacity of the file "file C" is "500 KB". Accordingly, the required file operation is judged to be a file operation exceeding the file capacity, so that the file operation increases the file capacity. Therefore, the total file capacity of the allowed file storage area "/app 1" is obtained and whether the total file capacity after the file operation exceeds the upper-limit value or not is judged based on the obtained total file capacity in Steps S114 and S116. In the above case, the total file capacity after the file operation is 900 KB+(700 KB−500 KB)="1100 KB" since data of 500 KB is written from a point of 200 KB from the top of the file "file C" although the total file capacity of the allowed file storage area "/app 1" is "900 KB". The total file capacity after the file operation is thus judged to be larger than the upper-limit value since the upper-limit value of the file capacity is "1000 KB".

When the total file capacity exceeds the upper-limit value, the file operation is stopped and the application 12 is informed of an error in Step S120.

As described above, in the embodiment, a file operation is allowed or limited for every file storage area and the total file number and the total file capacity of the allowed file storage area are obtained in timing of performing a file operation for the allowed file storage area. The file operation is arranged to be limited when any one of the total file number and the total file capacity after the file operation is judged to exceed the upper-limit value based on the obtained total file number and total file capacity.

This allows the upper-limit values of the file number and the file capacity to be set for every application 12 to limit the file operation for every file storing area, and thereby, allows a risk of pressuring the storage capacity due to execution of the application 12 to be reduced. Accordingly, execution of other applications 12 cannot be easily disturbed, so that the network printer 100 can be operated more stably than a case up to the present.

Further, the total file number and the total file capacity of a file storing area are obtained to judge whether limitation is performed or not in timing of a file operation. This can prevent even temporally the total file number and the total file capacity from exceeding the upper-limit value. Accordingly, control of the total file number and the total file capacity can be performed more certainly than a case up to the present.

Moreover, in the embodiment, a process relating to limitation of the file number is not carried out when the required file operation is judged to be a file operation for an existing file stored in the allowed file storage area.

Accordingly, obtaining the total file number and limiting a file operation are not necessary in the file operation for the existing file. This enables a process load to be reduced without any influence on control of the file number.

In addition, in the embodiment, a process relating to limitation of the file capacity is not carried out when the required file operation is judged to be a file operation for an existing file stored in the allowed file storing area and not to exceed the file capacity of the existing file.

Accordingly, obtaining the total file capacity and limiting a file operation are not necessary in the file operation not exceeding the file capacity of the existing file. This enables a process load to be reduced without any influence on control of the file capacity.

Furthermore, in the embodiment, when a new file is stored in the allowed file storing area, a predetermined buffer area is added to an area for storing file information of the file to store the file in the storage device 10.

This allows a risk of performing limitation relating to the file capacity to be reduced, so that the process load can be further decreased.

In the above embodiment, the storage device 10 corresponds to the storing unit in Aspects 1, 4, 7, 10, 12, 13, 16, 18, 19 and 22, the file storing area limiting part 16 and Step S104 correspond to the file storing area limiting unit in Aspects 1, 18 and 19 and Step S104 corresponds to limiting the file storing area in Aspects 7, 12 and 13. The total file number obtaining part 18 and Step S108 correspond to the total file number obtaining unit in Aspects 1, 2 and 18 to 20, Step S108 corresponds to obtaining the total file number in Aspects 7, 8 and 12 to 14 and the file number limiting part 20 and Step S110 correspond to the file number limiting unit in Aspects 1, 2 and 18 to 20.

In the above embodiment, Step S110 corresponds to limiting the file number in Aspects 7, 8 and 12 to 14, the total file capacity obtaining part 22 and Step S114 correspond to the total file capacity obtaining unit in Aspects 1, 3, 18, 19 and 21 and Step S114 corresponds to the total file capacity obtaining step in Aspects 7, 9, 12, 13 and 15. The file capacity limiting part 24 and Step S116 correspond to the file capacity limiting unit in Aspects 1, 3, 18, 19 and 21. Step S116 corresponds to limiting the file capacity in Aspects 7, 9, 12, 13 and 15. The CPU 50 corresponds to the calculating unit in Aspect 13.

Moreover, in the above embodiment, the printer engine 64 corresponds to the printing unit in Aspect 19.

A file operation for a file stored in the storage device 10 in the network printer 100 is arranged to be monitored in the embodiment. The invention, however, is not limited to the above. It may be arranged that a file operation for a file stored in the storage device in a file server 200 be monitored, as shown in FIG. 4.

Figure 4:
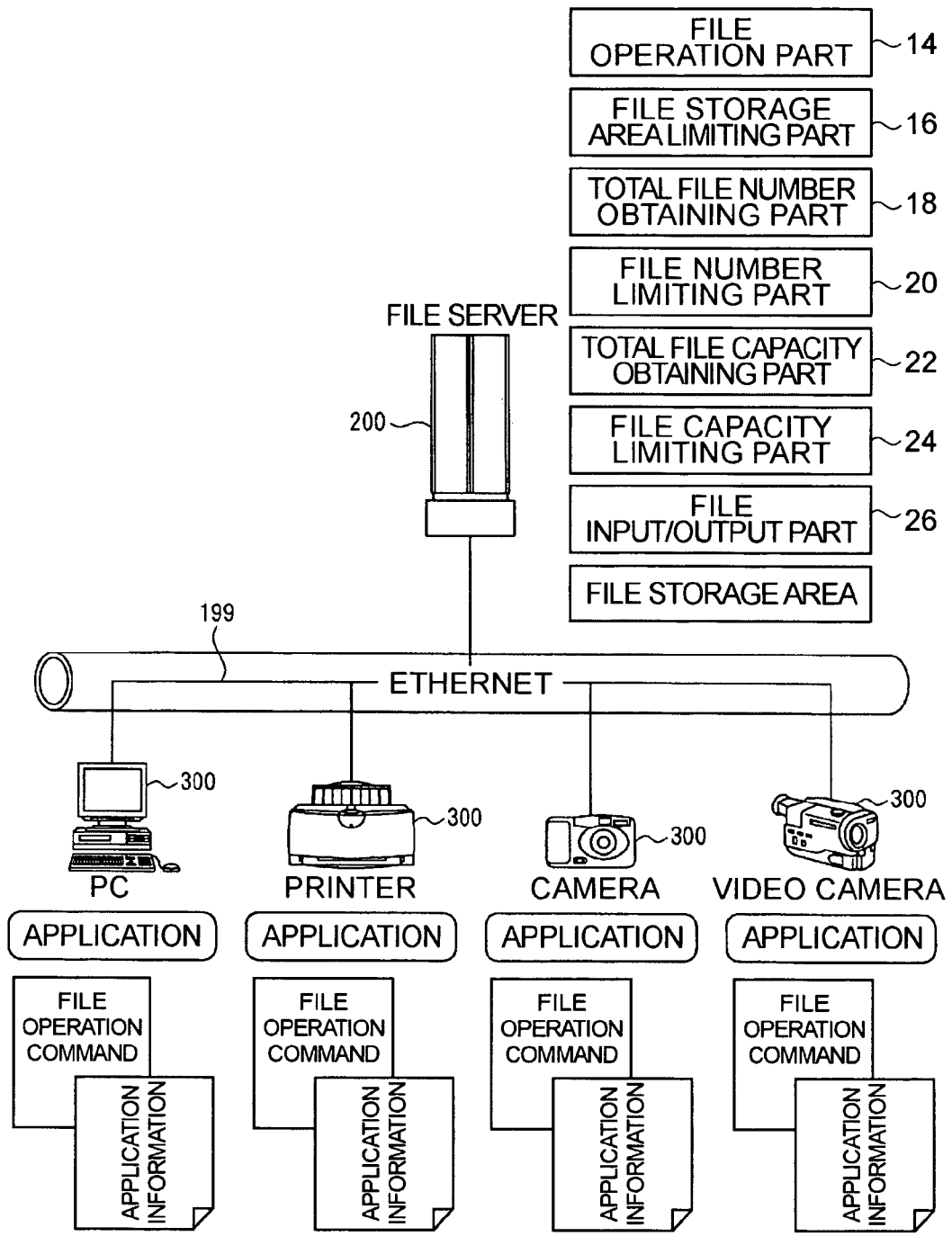
FIG. 4 is a block diagram showing a structure of a network system including a file server 200.

FIG. 4 is a block diagram showing a structure of a network system including the file server 200.

A network 199 is connected to the file server 200 and plural information apparatuses 300.

The information apparatus 300 has an environment for executing the application 12, which requires that a file is inputted or outputted to or from the storage device of the file server 200. The application 12 outputs a file operation command, application information and necessary file data to the file server 200 through the network 199.

The file server 200 includes a file operation part 14, a file storage area limiting part 16, a total file number obtaining part 18, a file number limiting part 20, a total file capacity obtaining part 22, a file capacity limiting part 24 and a file input/output part 26. The file server 200 carries out a file operation based on a file operation command and application information, which are inputted from an information apparatus 300.

In the embodiment, it is arranged that upper-limit values of the file number and the file capacity be set for every application 12 so as to limit a file operation for every file storage area. The invention, however, is not limited to the above. The upper-limit values of the file number and the file capacity may be arranged to be set for every user to limit a file operation for every file storage area.

Further, in the embodiment, described is a case that a controlling program stored in the ROM 52 in advance is executed in executing a file operation monitoring process shown in a flowchart of FIG. 3. The invention, however, is not limited to the above. A program showing the process may be read into the RAM 54 from a storage medium where the program is stored, for the purpose of executing the program.

The storage medium means a semiconductor storage medium such as a RAM and a ROM, a magnetic memory type storage medium such as an FD and an HD, an optical reading type storage medium such as a CD, a CDV, an LD and a DVD or a magnetic memory type/optical reading type storage medium such as an MO. The storage medium includes any kinds of storage medium regardless of the way of reading such as electronic reading, magnetic reading and optical reading so long as the storage medium is readable by a computer.

Moreover, in the embodiment, the file operation limiting system, a file operation limiting program, a file operation controlling method, electronics and a printing apparatus according to the invention are applied to a case that printing data sent from a terminal of a host is controlled as a file in the network printer 100 for confidential printing. The invention, however, is not limited to the above. They may be applicable to other cases within a range not exceeding the spirit of the invention. The following modifications may be considered, for example.

First, the file operation limiting system, a file operation limiting program, a file operation controlling method, electronics and a printing apparatus according to the invention are applicable to a projector, an electronic paper, a home gateway, a personal computer, a PDA (a personal digital assistant), a network storage, audio equipment, a mobile phone, a PHS (a registered trademark) (a personal handy-phone system), a watch type PDA, an STB (a set top box), a POS (point of sale) terminal, a FAX machine, a telephone (including an IP phone), a digital TV and other devices, for example, instead of the network printer 100.

Second, the invention is not limited to a single apparatus such as the network printer 100 but may be applicable to a combination of plural devices. For example, three of the storage device 10, a file operation device and a file operation limiting device can be combined. In this case, the file operation device includes the file operation part 14 while the file operation limiting device includes the file storage area limiting part 16, the total file number obtaining part 18, the file number limiting part 20, the total file capacity obtaining part 22, the file capacity limiting part 24 and the file input/output part 26. The devices may be connected via a network, for example.

What is claimed is:

1. A file operation limiting system for limiting a file operation for a file stored in a storage unit, wherein
the storage unit includes a file storage area into which a storage area of the storage unit is logically sectioned,
the file operation limiting system comprising:
a file storage area limiting unit for limiting the file operation for every file storage area for at least a part of the sectioned file storage areas;
a total file number obtaining unit for obtaining a total file number of a file storage area not limited by the file storage area limiting unit whenever the file operation is carried out for the file storage area among the sectioned file storage areas;
a file number limiting unit for limiting the file operation when the total file number after the file operation is judged to exceed a predetermined upper-limit value of a file number based on the total file number obtained by the total file number obtaining unit;
a total file capacity obtaining unit for obtaining total file capacity of a file storage area not limited by the file storage area limiting unit whenever the file operation is carried out for the file storage area among the sectioned file storage areas; and
a file capacity limiting unit for limiting the file operation when the total file capacity after the file operation is judged to exceed a predetermined upper-limit value of file capacity based on the total file capacity obtained by the total file capacity obtaining unit.

2. The file operation limiting system according to claim 1, wherein
the total file number obtaining unit does not obtain the total file number while the file number limiting unit does not limit the file operation when the file operation is judged to be a file operation for a file stored in the file storage area.

3. The file operation limiting system according to claim 1, wherein
the total file capacity obtaining unit does not obtain the total file capacity while the file capacity limiting unit does not limit the file operation when the file operation is judged to be a file operation for a file stored in the file storage area and not to exceed the file capacity of the file.

4. The file operation limiting system according to claim 3, wherein
a predetermined buffer area is added to an area for storing file information of a new file to store the new file in the storage unit when the new file is stored in the file storage area.

5. The file operation limiting system according to claim 1, wherein
the file operation is a file operation by an application and an upper-limit value of the file number and an upper-limit value of the file capacity are set for every application.

6. A file operation limiting system comprising: a storage device; a file operation device for performing a file operation for a file stored in the storage unit; and a file operation limiting device for limiting the file operation, wherein
the storage device includes the storage unit,
the storage unit includes a file storage area into which a storage area of the storage unit is logically sectioned,
the file operation device includes a file operation unit for performing the file operation,
the file operation limiting device including:
a file storage area limiting unit for limiting the file operation by the file operation unit for every file storage area for at least a part of the sectioned file storage areas;
a total file number obtaining unit for obtaining a total file number of a file storage area not limited by the file storage area limiting unit whenever the file operation by the file operation unit is carried out for the file storage area among the sectioned file storage areas;
a file number limiting unit for limiting the file operation by the file operation unit when the total file number after the file operation by the file operation unit is judged to exceed a predetermined upper-limit value of a file number based on the total file number obtained by the total file number obtaining unit;
a total file capacity obtaining unit for obtaining total file capacity of the file storage area not limited by the file storage area limiting unit whenever the file operation by the file operation unit is carried out for the file storage area among the sectioned file storage areas; and
a file capacity limiting unit for limiting the file operation by the file operation unit when the total file capacity after the file operation by the file operation unit is judged to exceed a predetermined upper-limit value of file capacity based on the total file capacity obtained by the total file capacity obtaining unit.

7. A file operation limiting program for limiting a file operation for a file stored in a storage unit, wherein
the storage unit includes a file storage area into which a storage area of the storage unit is logically sectioned,
the file operation limiting program stored in memory including a program for executing by a computer processes of:
limiting the file operation for every file storage area for at least a part of the sectioned file storage areas;
obtaining a total file number of a file storage area not limited by limiting the file operation for every file storage area for at least a part of the sectioned file storage areas whenever the file operation is carried out for the file storage area among the sectioned file storage areas;
limiting the file operation when the total file number after the file operation is judged to exceed a predetermined upper-limit value of a file number based on the total file number obtained by obtaining the total file number of the file storage area;
obtaining total file capacity of the file storage area not limited by limiting the file operation for every file storage area for at least a part of the sectioned file storage areas whenever the file operation is carried out for the file storage area among the sectioned file storage areas; and
limiting the file operation when the total file capacity after the file operation is judged to exceed a predetermined upper-limit value of file capacity based on the total file capacity obtained by obtaining the total file capacity of the file storage area.

8. A file operation limiting method for limiting a file operation for a file stored in a storage unit, wherein the method comprising step of:
the storage unit includes a file storage area into which a storage area of the storage unit is logically sectioned, the file operation for every file storage area for at least a part of the sectioned file storage areas is limited, a total file number of a file storage area not limited by limiting the file operation for every file storage area for at least a part of the sectioned file storage areas is obtained whenever the file operation is carried out for the file storage area among the sectioned file storage areas, the file operation is limited when the total file number after the file operation is judged to exceed a predetermined upper-limit value of a file number based on the total file number obtained by obtaining the total file number of the file storage area, total file capacity of the file storage area not limited by limiting the file operation for every file storage area for at least a part of the sectioned file storage areas is obtained whenever the file operation is carried out for the file storage area among the sectioned file storage areas, and the file operation is limited when the total file capacity after the file operation is judged to exceed a predetermined upper-limit value of file capacity based on the total file capacity obtained by obtaining the total file capacity of the file storage area.

9. Electronics for limiting a file operation for a file stored in a storage unit, wherein the storage unit includes a file storage area into which a storage area of the storage unit is logically sectioned, the electronics comprising:

a file storage area limiting unit for limiting the file operation for every file storage area for at least a part of the sectioned file storage areas;

a total file number obtaining unit for obtaining a total file number of a file storage area not limited by the file storage area limiting unit whenever the file operation is carried out for the file storage area among the sectioned file storage areas;

a file number limiting unit for limiting the file operation when the total file number after the file operation is judged to exceed a predetermined upper-limit value of a file number based on the total file number obtained by the total file number obtaining unit;

a total file capacity obtaining unit for obtaining total file capacity of the file storage area not limited by the file storage area limiting unit whenever the file operation is carried out for the file storage area among the sectioned file storage areas; and a file capacity limiting unit for limiting the file operation when the total file capacity after the file operation is judged to exceed a predetermined upper-limit value of file capacity based on the total file capacity obtained by the total file capacity obtaining unit.

10. A printing apparatus for limiting a file operation for a file stored in a storage unit, wherein the storage unit includes a file storage area into which a storage area of the storage unit is logically sectioned, the printing apparatus comprising:

a file storage area limiting unit for limiting the file operation for every file storage area for at least a part of the sectioned file storage areas;

a total file number obtaining unit for obtaining a total file number of a file storage area not limited by the file storage area limiting unit whenever the file operation is carried out for the file storage area among the sectioned file storage areas;

a file number limiting unit for limiting the file operation when the total file number after the file operation is judged to exceed a predetermined upper-limit value of a file number based on the total file number obtained by the total file number obtaining unit;

a total file capacity obtaining unit for obtaining total file capacity of the file storage area not limited by the file storage area limiting unit whenever the file operation is carried out for the file storage area among the sectioned file storage areas;

file capacity limiting unit for limiting the file operation when the total file capacity after the file operation is judged to exceed a predetermined upper-limit value of file capacity based on the total file capacity obtained by the total file capacity obtaining unit; and a printing unit for carrying out printing based on the file in the storage unit.

11. The printing apparatus according to claim 10, wherein the total file number obtaining unit does not obtain the total file number while the file number limiting unit does not limit the file operation when the file operation is judged to be a file operation for a file stored in the file storage area.

12. The printing apparatus according to claim 10, wherein the total file capacity obtaining unit does not obtain the total file capacity while the file capacity limiting unit does not limit the file operation when the file operation is judged to be a file operation for a file stored in the file storage area and not to exceed the file capacity of the file.

13. The printing apparatus according to claim 12, wherein a predetermined buffer area is added to an area for storing file information of a new file to store the new file in the storage unit when the new file is stored in the file storage area.

14. The printing apparatus according to claim 10, wherein the file operation is a file operation by an application and an upper-limit value of the file number and an upper-limit value of the file capacity are set for every application.

\* \* \* \* \*